United States Patent
Skiens

(10) Patent No.: US 8,959,149 B1
(45) Date of Patent: Feb. 17, 2015

(54) PERSONAL BADGES FOR SOCIAL NETWORKS

(75) Inventor: Terrac Skiens, Portland, OR (US)

(73) Assignee: Google Inc., Mountain View, CA (US)

(*) Notice: Subject to any disclaimer, the term of this patent is extended or adjusted under 35 U.S.C. 154(b) by 261 days.

(21) Appl. No.: 13/316,322

(22) Filed: Dec. 9, 2011

(51) Int. Cl.
*G06F 15/16* (2006.01)

(52) U.S. Cl.
USPC ............................. 709/204; 715/751; 713/182

(58) Field of Classification Search
CPC ..... H04L 51/00; H04L 51/32; H04L 12/1881; G06F 15/16
USPC ............................. 709/204; 715/751; 713/182
See application file for complete search history.

(56) References Cited

U.S. PATENT DOCUMENTS

| | | | | |
|---|---|---|---|---|
| 4,980,679 | A * | 12/1990 | Klaubert | 345/50 |
| 5,054,088 | A * | 10/1991 | Gunderson et al. | 382/120 |
| 6,782,988 | B2 * | 8/2004 | Cantacuzene et al. | 194/302 |
| 7,327,217 | B2 * | 2/2008 | Carter et al. | 340/5.61 |
| 2007/0243769 | A1 * | 10/2007 | Atsmon et al. | 439/660 |
| 2008/0052522 | A1 * | 2/2008 | McArdle | 713/182 |
| 2009/0174633 | A1 * | 7/2009 | Kumhyr | 345/82 |
| 2011/0195699 | A1 * | 8/2011 | Tadayon et al. | 455/418 |
| 2012/0151569 | A1 * | 6/2012 | Farsedakis | 726/8 |
| 2013/0086484 | A1 * | 4/2013 | Antin et al. | 715/751 |

OTHER PUBLICATIONS

"Live Office Hours," Penn State Berks, 2 pages, accessed: Feb. 15, 2012, Internet site: http://www.bk.psu.edu/Documents/Academics/Live_Office_Hours_74.pdf.
"Waiting chat room," ESL Forum, ESL Europe, Jul. 16, 2011, 2 pages, Internet link: http://www.esl.eu/eu/versus/forum/2663/24862/948424/.
"Chat Room Waiting Room," Community Forum, Star Wars the Old Republic, Dec. 20, 2011, 1 page, Internet link: http://www.swtor.com/community/showthread.php?t=56211.
"GroupWorld.net Tutor Queue Help," GroupWorld.net, 1 page, accessed: Feb. 15, 2012, Internet site: http://www.groupworldnet/help/tutorqueue.html.
"Solution Paper BEEHD-Based Video Contact Center Service," Radvision, 2 pages, accessed: Feb. 15, 2012, Internet site: http://www.radvision.com/Developer-Solutions/Contact-Center-Solutions/.
"Features of live chat software," Chat2Visitor.com, 4 pages, accessed: Feb. 15, 2012, Internet site: http://www.chat2visitor.com/Features.html.

* cited by examiner

*Primary Examiner* — Tesfay Yohannes
(74) *Attorney, Agent, or Firm* — Patent Law Works LLP

(57) ABSTRACT

A method for personal badges in a social network includes receiving a badge from a user, determining a degree of similarity between the badge and one or more other badges owned by one or more users connected to the user. The method also includes, when the degree of similarity is less than a predetermined amount, crediting the badge to particular ones of the one or more users as designated by the user. Badges credited to a user may be displayed in a profile page of the user.

19 Claims, 9 Drawing Sheets

| | 525 | 530 | 535 | |
|---|---|---|---|---|
| UserID | BadgeID | Badge Name | Badge Location |
| UserID #1 | BadgeID #1 | Flying Squirrel | /home/badge |
| UserID #2 | BadgeID #2 | Airplane | /home/badge |
| ... | ... | ... | ... |
| UserID #U | BadgeID #V | Traffic Jam | /home/badge |

FIG. 5A

| BadgeID | UserID |
|---|---|
| BadgeID #1 | UserID #1 |
| BadgeID #1 | UserID #2 |
| BadgeID #2 | UserID #2 |
| BadgeID #3 | UserID #3 |
| ... | ... |
| BadgeID #U | UserID #Y |

PERSONAL BADGES FOR SOCIAL NETWORKS

TECHNICAL FIELD

The disclosure generally relates to personal badges for social networks.

BACKGROUND

A social network can be an online system that provides a forum for geographically separated users to interact with one another, where those users have defined a relationship between one another. Users can control who can view their information by identifying particular relationships with other users, and can also find new user from the group of other people who are "friends" of their own friends. Social networks can be aimed at different types of social interaction, such as friendship and business networking. A user of a social network can have a profile page (e.g., a web page on the social network) that provides information about the user to other users of the social network. A profile can include information regarding a user's acquaintance relationships (e.g., friends, colleagues, schoolmates, etc.) on the social network.

A badge is a digital image that may be earned or unlocked by checking into various venues. Once a badge is earned by a user, it will remain on that user's profile indefinitely. Operators of social networks are typically secretive about how to unlock badges. Some introductory badges may be earned as milestones in usage. Some badges are tied to venue "tags" and the badge earned depends on the tags applied to the venue. Other badges may be specific to a city, venue, event, or date. Some badges use identical icons, but are earned differently. Accordingly, a need exists in the art for an improved solution for badges for social networks.

BRIEF DESCRIPTION OF THE DRAWINGS

The accompanying drawings, which are incorporated into and constitute a part of this specification, illustrate one or more embodiments of the present disclosure and, together with the detailed description, serve to explain the principles and implementations of the present disclosure.

In the drawings:

FIG. 5A depicts a data structure for storing badge ownership information in accordance with some embodiments of the present disclosure.

FIG. 5B depicts a data structure for storing badge crediting information in accordance with some embodiments of the present disclosure.

DESCRIPTION OF EXAMPLE EMBODIMENTS

Overview

According to some aspects of the present disclosure, a method for personal badges in a social network includes receiving a badge from a user, and determining a degree of similarity between the badge and one or more other badges owned by one or more users connected to the user. The method also includes, when the degree of similarity is less than a predetermined amount, crediting the badge to particular ones of the one or more users as designated by the user. Badges credited to a user may be displayed in a profile page of the user.

Embodiments of the present disclosure are described herein in the context of personal badges for social networks. Those of ordinary skill in the art will realize that the following detailed description of the present disclosure is illustrative only and is not intended to be in any way limiting. Other embodiments of the present disclosure will readily suggest themselves to such skilled persons having the benefit of this disclosure. Reference will now be made in detail to implementations of the present disclosure as illustrated in the accompanying drawings. The same reference indicators will be used throughout the drawings and the following detailed description to refer to the same or like parts.

Example embodiments of the present disclosure provide a solution for personal badges for social networks, wherein a user imports or creates a badge comprising a digital image and then credits the badge to users connected to the user, based on criteria set by the user. A badge may be displayed as a mark of office, membership, achievement, or activity. Badges are checked to determine whether they are too similar to existing badges being used by users connected to the user. Badges credited to a user may be displayed in a profile page of the user.

According to some embodiments, in a network of users connected to one another, a badge may have one or more owners. An owner of a badge is a user that determines which users in the network of users are credited with the badge. This determination can be made either alone or in combination with other owners ("co-owners") of the badge. A user can be an owner with respect to badges the user owns, and the same user can be credited with badges owned by other users.

High Level Functional Description

Figure 1:
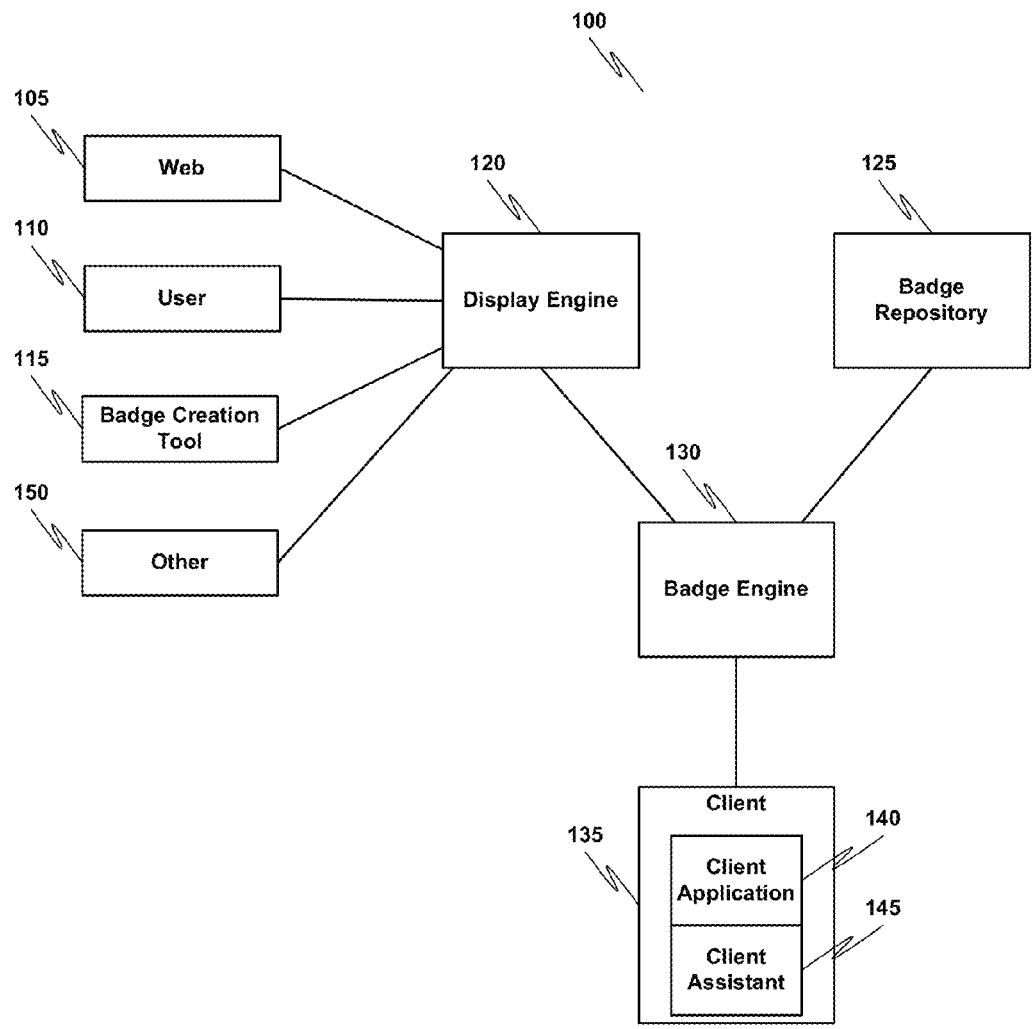
FIG. 1 illustrates a high level functional description of a system in accordance with some embodiments of the present disclosure.

FIG. 1 is a conceptual depiction of a personal badge system 100. A badge engine 130 is connected to a client 135, a badge repository 125 and a display engine 120. The badge engine 130 responds to requests from client 135 and provides badges from the badge repository 125 and information in various formats to the client 135. The client requests may be generated in response to activities performed by a user at the client 135, such as displaying badges owned by a user associated with the client 135, or displaying badges credited to the user, or the like. The badge engine 130 sends various informational items as part of the information and badges sent to the client 135. The display engine 120 is connected to one or more badge sources. FIG. 1 illustrates a number of exemplary types of sources of badges. The badge sources may include the Web 105, another user 110, or a badge creation tool 115, and other sources of badges 126. FIG. 1 illustrates exemplary types of sources of badges. In some embodiments, the badge sources may include a subset of those shown in FIG. 1, and may further include additional types of badge sources. Each type of badge source may include one or more sources of badges of that type. For example, a user may be presented with or identify one or more websites, each of which produces badges which may or may not be from the same content provider. In some embodiments, the display engine 120 coordinates the retrieval and/or selection of badges from the badge sources which it subsequently provides to the badge engine 130 for incorporation into the badge display information sent to the client 135. In some embodiments, the badge engine 130 combines the badges received from the display engine 120 and the badges received from the badge repository 125 into display information which is transmitted to the client 135. At the client 135, the badge information is received by the client assistant 145 and ultimately displayed to the user via the client application 140.

Example System Description

Figure 2:
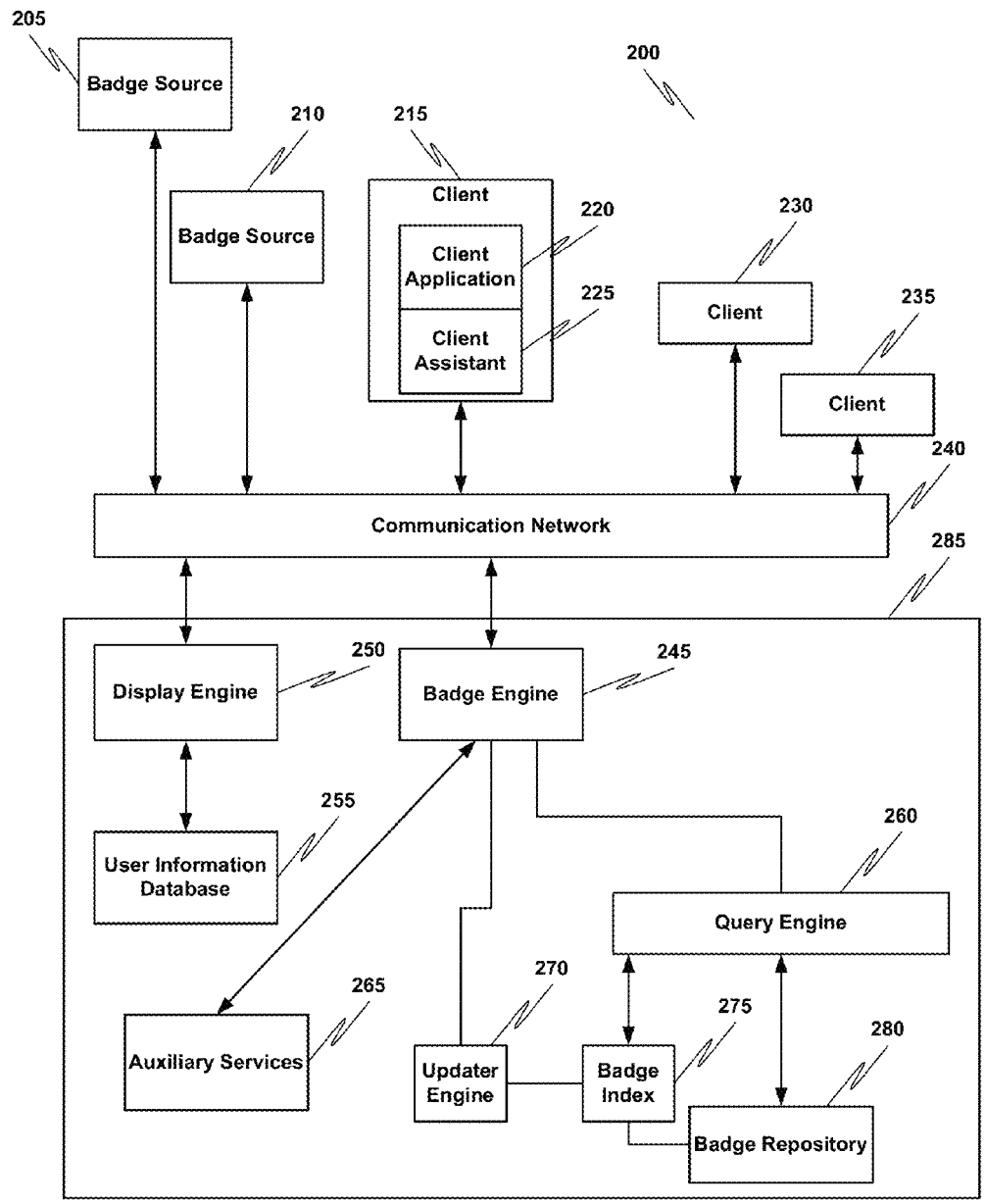
FIG. 2 depicts a block diagram of a system in accordance with some embodiments of the present disclosure.

FIG. 2 depicts an exemplary environment 200 for implementing some embodiments. One or more clients 215 are connected to a communication network 240. The communication network 240 is connected to a badge server 286. The communication network 240 is also connected to one or more badge sources (205, 210). Alternately, the badge server 285 may be connected to one or more badge sources (205, 210) by a distinct communication network (e.g., a local area network or an intranet, not shown) from the one used to communicate with the clients 240; or the badge server 285 may be connected to some badge sources (205, 210) by the communication network 250 and to other badge sources by another communication network or channel (not shown).

The badge server 285 includes a badge engine 245, an updater engine 270, a badge index 275, a query engine 260, a badge repository 280, one or more auxiliary services servers 265, and a display engine 250. The display engine 250 is connected to a user information database 255 and to the communication network 240.

Each client 215 includes a client application 220 and a client assistant 225. The client 215 can be any number of devices (e.g., computer, internet kiosk, personal digital assistant, cell phone, gaming device, desktop computer, laptop computer, set-top box) which may be used to connect to the communication network 240. The communication network 240 may be a wireless, optical, wired or other type of network that facilitates the passage of information. It may include the Internet, one or more local area networks (LANs), one or more wide are networks (WANs), other types networks, or a combination of such networks. The client application 230 is an application that is executed by the client (e.g., browser, e-mail client, word processor) and that displays or presents information to a user of the client (the client application may also perform other tasks not relevant to the present discussion). The client assistant 225 is an application that facilitates the display or presentation of information by the client application 220. The client assistant 225 can be part of the client application 220, a plug-in to the client application 220, stand-alone application, or otherwise (e.g., a JavaScript application downloaded as part of a web page). In some embodiments, the client assistant 225, or portions of the client assistant 225 are downloaded along with badges or other information sent to the client 202. For instance, the client assistant 225 may be one or more scripts (e.g., JavaScript programs) embedded in other content. In this way, different versions of the client assistant 225 are provided to the client 215 without requiring any explicit action by the user of the client 215.

The badge engine 245 handles requests from and responses to the client assistant 225, via its connection with communication network 240. The badge engine 245 is also connected to various auxiliary services such as auxiliary services servers 265. A query engine 260 is connected to the badge engine 245, the badge index 275, and the badge repository 280. An updater engine 270 is connected between the badge engine 245 and badge index 275 as well as badge repository 280.

FIG. 2 is exemplary, in some embodiments, the badge server 285 contains a subset of or superset of those elements illustrated in FIG. 2. Although FIG. 2 shows the badge server 285 as a number of discrete items, the figure is intended more as a functional description of the various features which may be present in the badge server 285 rather than a structural schematic of the embodiments described herein. In practice, and as recognized by those of ordinary skill in the art, items shown separately could be combined and some items could be separated. For example, some items shown separately in the figure could be implemented on a single server and single items could be implemented by one or more servers. The actual number of servers in badge server 285 and how features are allocated among them will vary from one implementation to another, and may depend in part on the amount of email traffic that the system must handle during peak usage periods as well as during average usage periods. For example, the user information database 255 could be implemented as a stand-alone server or servers. The badge repository 280 could be implemented using a plurality of servers.

The one or more auxiliary services servers 265 provide additional services to the badge engine 245. In some embodiments, the auxiliary services servers 265 include a spam detection module. In some embodiments, the auxiliary services servers 265 include an attachment management module, which manages the efficient storage and retrieval of files attached to email messages.

The badge engine 245 is also attached to the display engine 250. The item display engine 250 determines which badges should be displayed along based on, depending on the circumstances, one or more of the display view of the badge application, the content of the badges, and certain probabilistic display characteristics (described below). The user information database 255 contains information about users, including any preferences they may have with respect to the display of the badges. For example, a user may select one or more types of badges to be displayed. The user may also identify desired or preferred sources of badges. The display engine 250 is also connected to the communication network 285. The display engine 250 passively receives and/or actively retrieves (as the case may be) various information associated with the badges. For example, the display engine 250 may query a search engine for similar badges.

Establishing Badge Ownership

Figure 3:
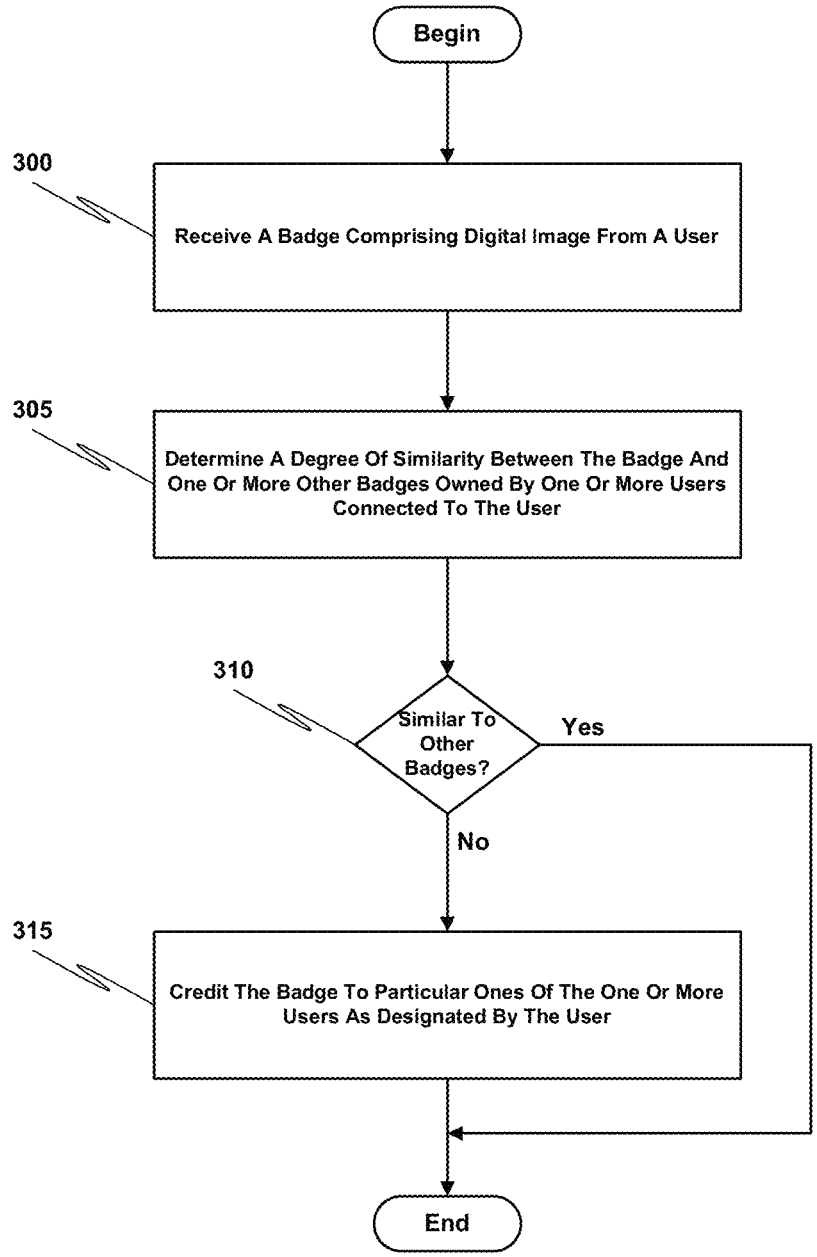
FIG. 3 is a flow diagram that illustrates a method for personal badges for social networks in accordance with one embodiment of the present disclosure.

FIG. 3 is a flow diagram that illustrates a method for personal badges for social networks in accordance with one embodiment. The processes illustrated in FIG. 3 may be implemented in hardware, software, firmware, or a combination thereof. For example, the processes illustrated in FIG. 3 may be implemented by badge server 285 of FIG. 2 or user device 605 of FIG. 6. At 300, a computer receives a badge comprising a digital image from a user. At 305, a similarity between the badge and one or more other badges owned by one or more users connected to the user is determined. At 310, a determination is made regarding whether the degree of similarity between the badge received from the user and one or more other badges owned by one or more users connected to the user, is more than a predetermined amount. If at 310 the degree of similarity is less than a predetermined amount, at 315 the badge received from the user is credited to particular ones of the one or more users as designated by the user. An indication which users the badge has been credited to may be stored in a memory 235 of the computer.

According to one embodiment, the one or more users connected to the user comprise one or more friends of the user in a social network.

According to one embodiment, the determining comprises determining a degree of similarity between a textual description of the badge and textual descriptions of the one or more other badges. For example, a first badge having a textual description of "Man Holding Hammer" may be considered too similar to a second badge having a textual description of "Man With Hammer." As a further example, a first badge having a textual description of "Thailand Temple" may be considered sufficiently dissimilar to a second badge having a textual description of "Temple University."

According to one embodiment, the determining comprises determining a degree of similarity between a content of the badge and content of the one or more other badges. The content of the badges may be compared using any known badge comparison method.

According to one embodiment, when the degree of similarity is greater than the predetermined amount, an application is made to an owner of the particular one of the one or more other badges having a degree of similarity greater than the predetermined amount, to be a new owner of the particular one of the one or more other badges. In other words, when a badge that the user wants to use as a badge is too similar to another badge owned by one of the users connected to the user, the user may ask the owner of the similar badge make the user the new owner of the similar badge. If the current owner agrees to make the user the new owner of the similar badge, the user would determine who is credited with the similar badge in the future.

According to one embodiment, when the degree of similarity is greater than the predetermined amount, an application is made to an owner of the particular one of the one or more other badges having a degree of similarity greater than the predetermined amount, to be a co-owner of the particular one of the one or more other badges. In other words, when a badge that the user wants to use as a badge is too similar to another badge owned by one of the users connected to the user, the user may ask the owner of the similar badge to be a co-owner of the similar badge. If the owner of the similar badge agrees to the co-ownership, both co-owners would determine who is credited with the similar badge. The determination may be made by one or more of the co-owners, either alone or in combination with other co-owners.

A user may obtain a badge from a variety of sources. According to one embodiment, the badge is uploaded by the user. The uploaded image may be a picture taken or created by the user, or a picture taken or created by someone other than the user (110). According to another embodiment, the badge is created using a graphic creation application 115 on the computer.

According to another embodiment, a user is required to pass a publicly available test to receive a badge. An entity may issue a set of default badges for things which concern the entity. For example, a software company may issue a set of default badges that relate to programming concepts, using online coding challenges, and unit tests to confirm readability.

According to one embodiment, the crediting the badge to one or more users connected to the user as designated by the user further comprises crediting the badge to the one or more users connected to the user in response to a request from the one or more users connected to the user. In other words, a user credits a badge to a user connected to the user after the user connected to the user asks for the badge.

According to one embodiment, crediting the badge to one or more users connected to the user as designated by the user includes crediting the badge to a particular user connected to the user if the user connected to the user meets one or more criteria of the user. In other words, a user credits a badge to a user connected to the user only if the user connected to the user meets criteria the user has established for receiving the badge. The criteria may be determined solely by the user, or by the user and one or more users connected to the user.

According to one embodiment, when the determined degree of similarity is less than the predetermined amount, a profile of the particular ones of the one or more users is modified to indicate the crediting. The profile for a user shows which badges have been credited to the user. The user may determine which other users can view the profile and thus see which badges have been credited to the user.

According to one embodiment, the one or more criteria comprises performance of an action associated with the badge. For example, a user that owns a badge may require that a user connected to the user bike to work before receiving an "I bike to work" badge owned by the user. As an additional example, a user that owns a badge may require that a user connected to the user participate in a marathon before receiving a "marathon" badge owned by the user.

According to one embodiment, the one or more criteria comprises having a particular hobby. For example, a user that owns a badge may require that a user connected to the user have a gardening hobby before receiving a "gardener" badge owned by the user. As an additional example, a user that owns a badge may require that a user connected to the user have a woodworking hobby before receiving a "woodworking" badge owned by the user.

According to one embodiment, the one or more criteria comprises an achievement associated with the badge. For example, a user that owns a badge may require that a user connected to the user graduate from Central High School before receiving a "Central High School Graduate" badge. As an additional example, a user that owns a badge may require that a user connected to the user obtain a minimum score in an online game before receiving a "high score" badge owned by the user.

According to one embodiment, the method further comprises verifying that the one or more users connected to the user meet the one or more criteria. For example, when a user connected to the user requests an online game "high score" badge owned by the user, the user may verify that the user connected to the user obtained the minimum required score before crediting the badge to the user connected to the user. This may be done by searching an online "High Scores" list for the online game.

As an additional example, when a user connected to the user requests a "Central High School Graduate" badge, the user may verify that the user connected to the user graduated from Central High School. This may be accomplished by searching an online alumni directory for the school.

Crediting Badges to Users

Figure 4:
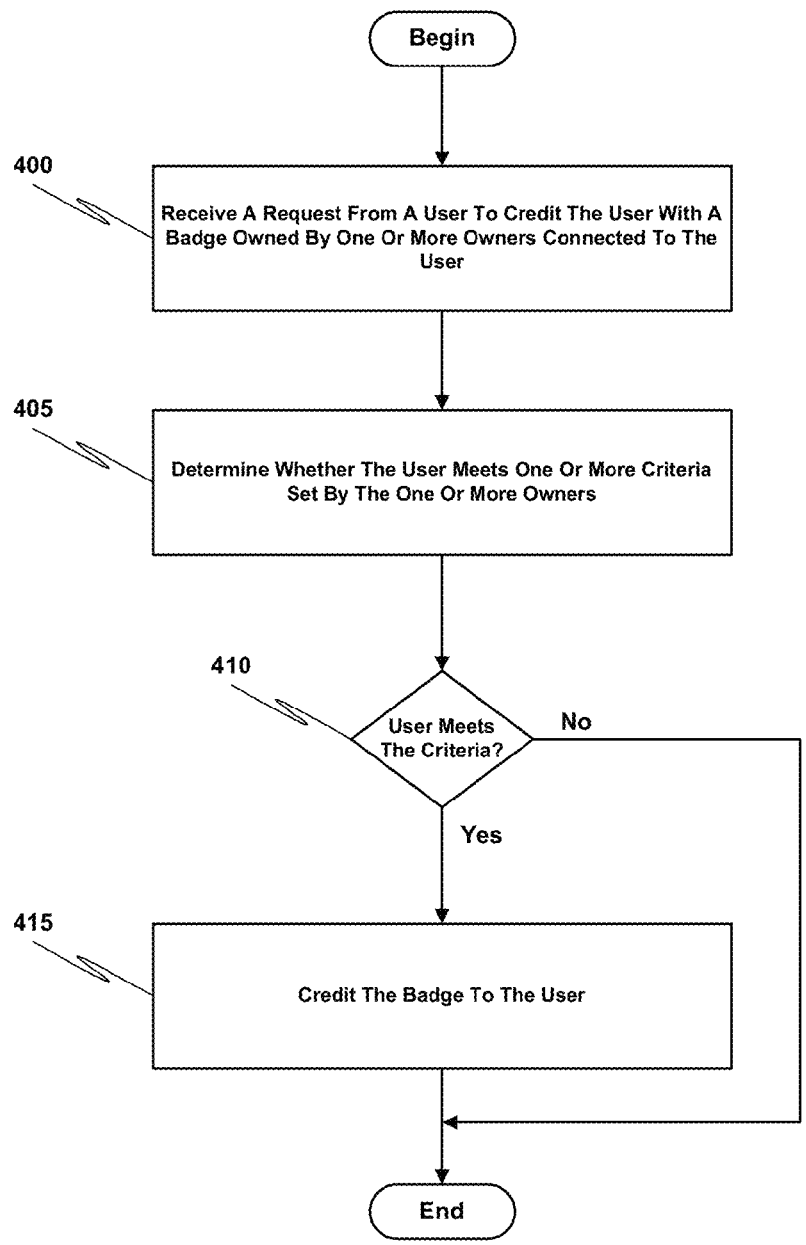
FIG. 4 is a flow diagram that illustrates a method for personal badges for social networks in accordance with one embodiment of the present disclosure.

FIG. 4 is a flow diagram that illustrates a method for personal badges for social networks in accordance with one embodiment. The processes illustrated in FIG. 4 may be implemented in hardware, software, firmware, or a combination thereof. For example, the processes illustrated in FIG. 4 may be implemented by badge server 285 of FIG. 2 or user device 605 of FIG. 6. At 400, a computer receives a request from a user to credit the user with a badge owned by one or more owners connected to the user. At 405, a determination is made whether the user meets one or more criteria set by the one or more owners of the badge. If at 410 the user meets the one or more criteria set by the one or more owners of the badge, at 415 the badge is credited to the user.

Example Data Structures

FIG. 5A depicts a data structure for storing badge ownership information in accordance with some embodiments of the present disclosure. FIG. 5 illustrates an exemplary badge ownership table 500 in a user information database 255 which is used in some embodiments to indicate ownership of badges. In some embodiments, table 500 includes a plurality of records, each having a user identifier portion 505, a badge identifier portion 510, a badge name portion 515, and a badge location portion 520. The table 500 includes one or more records such as record 525 associated with a UserID #1, a badge ID#1, a badge name of "Flying Squirrel," and a badge location of "/home/badge," record 530 associated with a UserID #2, a badge ID#2, a badge name of "Airplane," and a badge location of "/home/badge," record 530 associated with a UserID #2, a badge ID#1, a badge name of "Flying Squirrel," and a badge location of "/home/badge," and record 535 associated with a UserID #U, a badge ID#V, a badge name of "Traffic Jam," and a badge location of "/home/badge." The entries in any particular record 525, 530, and 535 of table 500 are merely exemplary. In some embodiments, users may have differing sets of entries in their respective record. As illustrated in FIG. 5, a record 525 includes a different set of entries as compared to the records 530 and 535.

FIG. 5B depicts a data structure for storing badge crediting information in accordance with some embodiments of the present disclosure. FIG. 5 illustrates an exemplary badge crediting table 540 in a user information database 255 which is used in some embodiments to indicate crediting of badges to particular users. In some embodiments, table 540 includes a plurality of records, each having a badge identifier portion 545 and a user identifier portion 550. The table 540 includes one or more records such as record 555 associated with a BadgeID #1 and a UserID #1, record 560 associated with a BadgeID #1 and a UserID #2, record 565 associated with a BadgeID #2 and a UserID #2, record 570 associated with a BadgeID #3 and a UserID #3, and record 575 associated with a BadgeID #U and a UserID #Y. As shown in table 540, BadgeID #1 has been credited to UserID #1 and UserID #2, BadgeID #2 has been credited to UserID #2, and BadgeID #3 has been credited to UserID #3. The entries in any particular record 555, 560, 565, 570, and 575 of table 540 are merely exemplary. In some embodiments, users may have differing sets of entries in their respective record. As illustrated in FIG. 5B, a record 555 includes a different set of entries as compared to the records 560, 565, 570, and 575.

Example User Device

Figure 6:
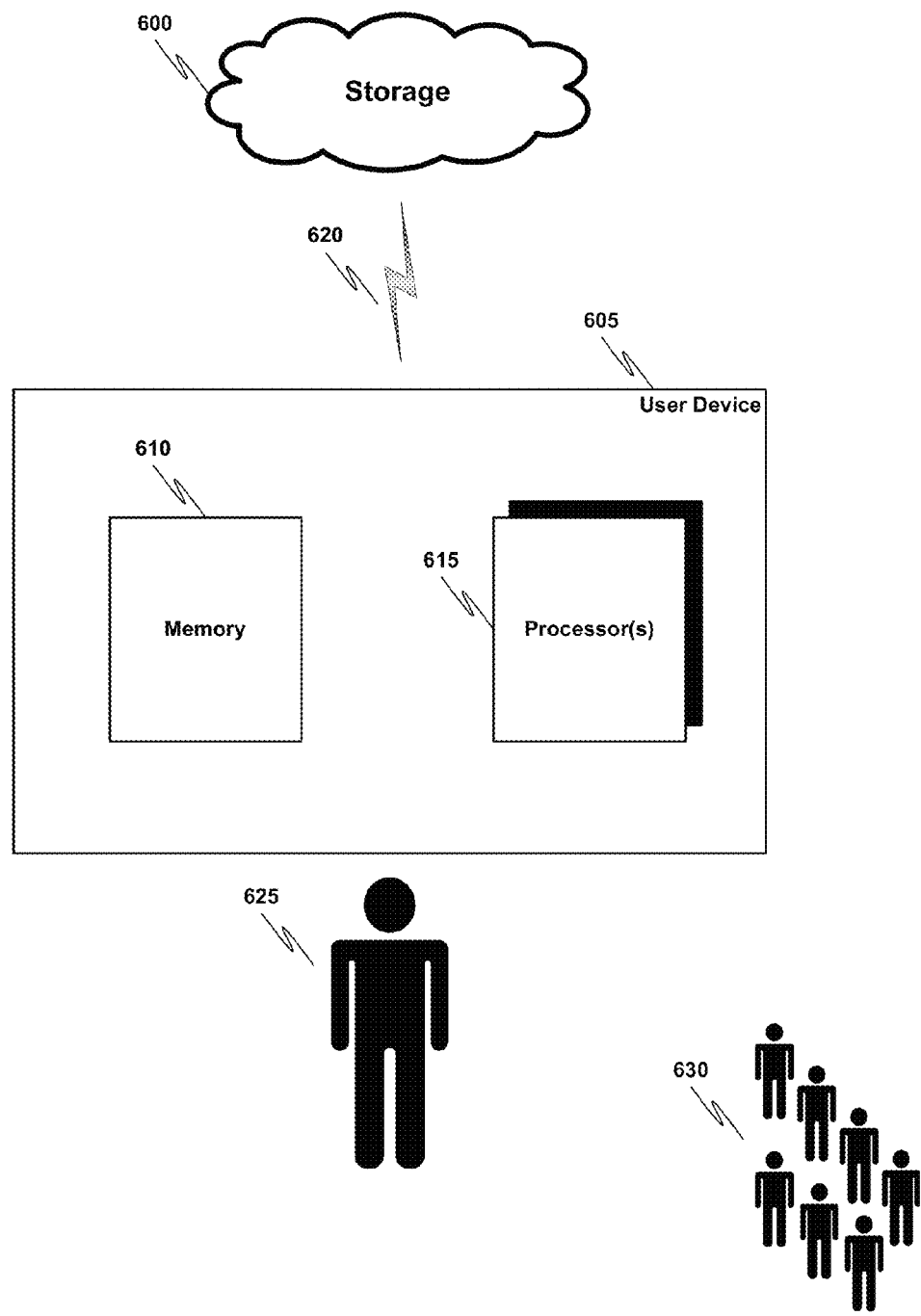
FIG. 6 is a block diagram that illustrates an apparatus for personal badges for social networks in accordance with one embodiment of the present disclosure.

FIG. 6 is a block diagram that illustrates an apparatus for personal badges for social networks in accordance with one embodiment. As shown in FIG. 6, user device 605 comprises a memory 610 and one or more processors 615. The one or more processors 615 are configured to receive a badge from a user 625. The one or more processors 615 are further configured to determine a similarity between the badge and one or more other badges owned by one or more users 630 connected to the user 625. The one or more processors 615 are further configured to determine whether the degree of similarity between the badge received from the user 625 and one or more other badges owned by one or more users 630 connected to the user 625, is more than a predetermined amount. The one or more processors 615 are further configured to, when the degree of similarity is less than a predetermined amount, credit the badge received from the user 625, to particular ones of the one or more users 630 as designated by the user 625.

Alternatively, the similarity determination may be performed in a cloud 600, and the results communicated to user device 605. Additionally, badges owned by user 625 and users 630 connected to the user 625 may be stored in memory 610, cloud 600, or a combination thereof.

Example Badges

Figure 7:
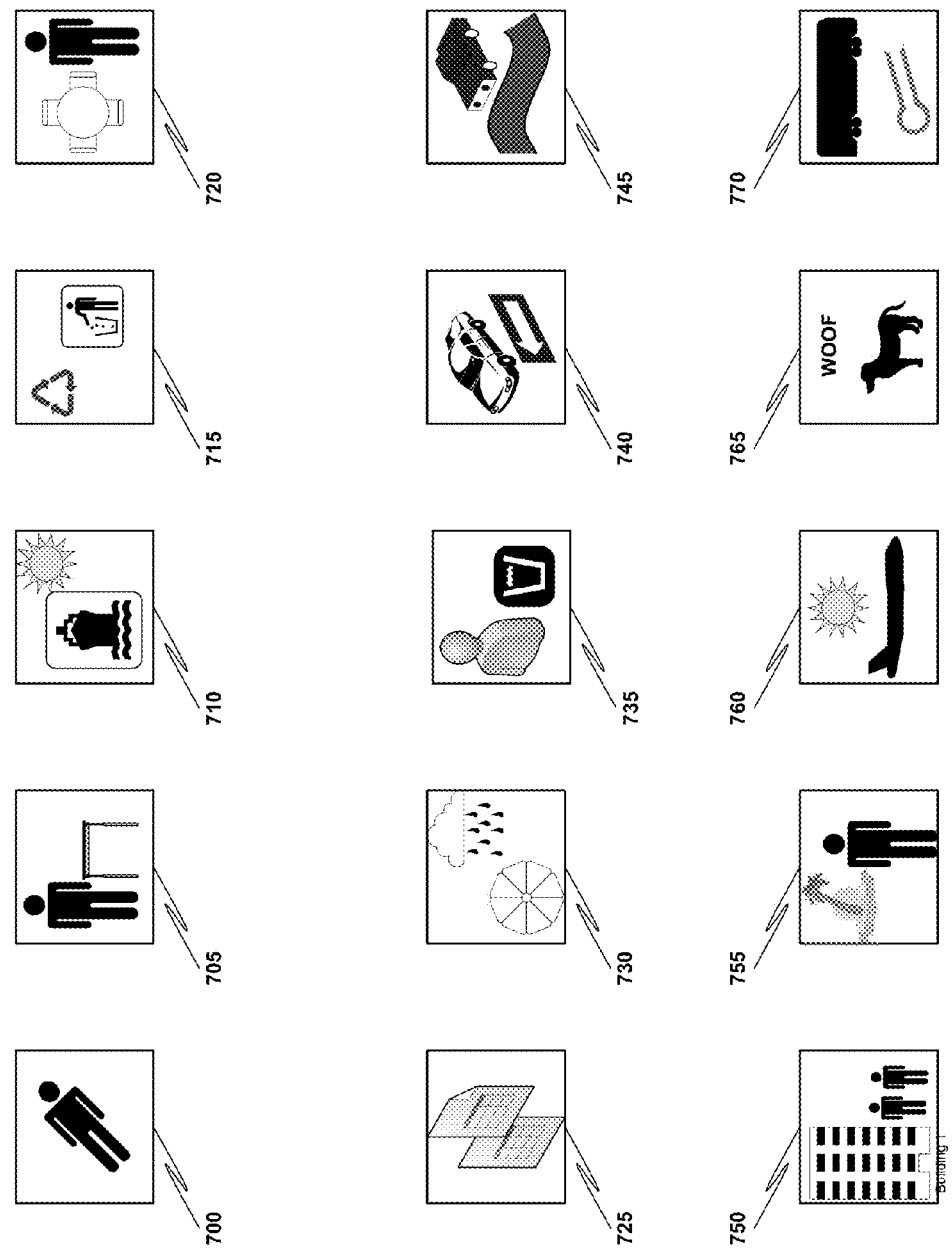
FIG. 7 depicts example badges in accordance with embodiments of the present disclosure.

FIG. 7 depicts example badges in accordance with embodiments of the present disclosure. The badges depicted in FIG. 7 are merely exemplary. A badge may be selected or created using any criteria set by a user. Additionally, a badge may be credited to other users using any criteria set by the owner(s) of the badge.

Example User Interface

Figure 8:
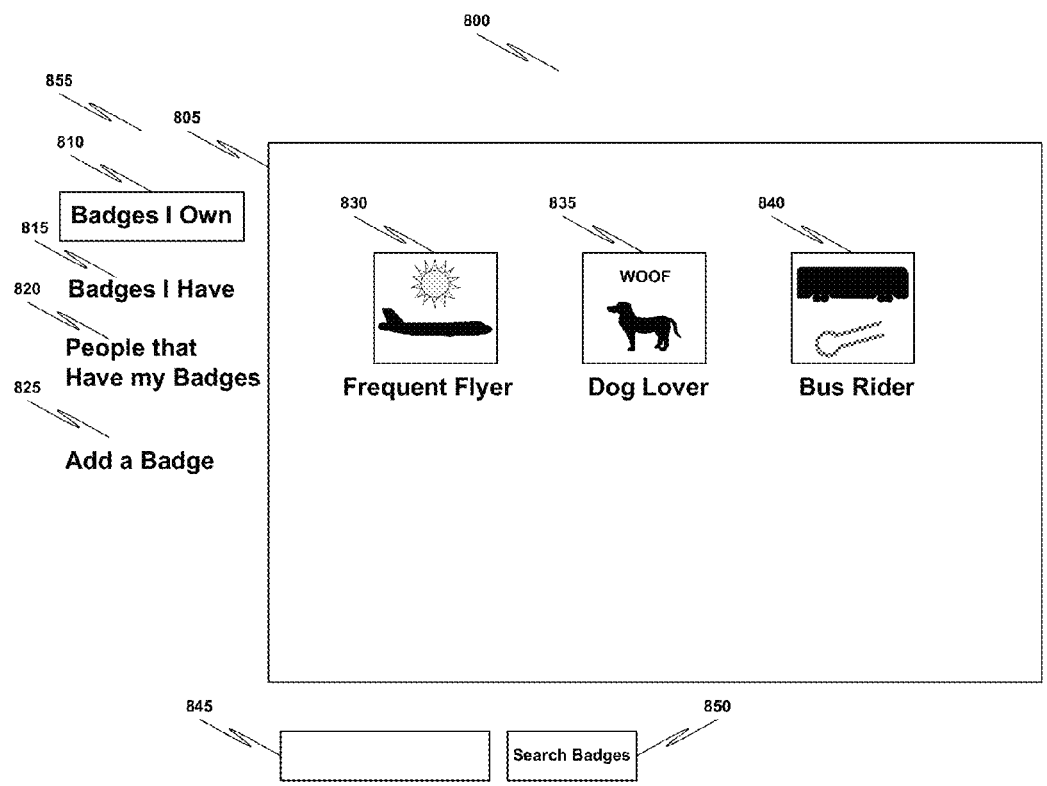
FIG. 8 depicts a conventional view of a user profile page display in accordance with some embodiments of the present disclosure.

FIG. 8 depicts a conventional view of a user profile page display 800 in accordance with some embodiments of the present disclosure. The display 800 may include one or more display portions such as display portions 805, 845, 850, and 855. A navigation portion 855 may provide a number of function choices to the user (e.g., display badges I own (810), display badges I have (815), display people that have my badges (820), and add a badge (825)). The navigation portion 855 includes various choices which the user may select, many of which cause a change in the display view type. A user may enter text in display portion 845. Clicking on button 850 may cause another page to be displayed, showing the results of searching for badges based on the text entered in display portion 845.

Display 800 illustrates a view after a user clicks on button 810 and shows example badges (830, 835, 840) owned by a user. Clicking on button 815 may cause another page to be displayed, showing badges that a user has. Clicking on button 820 may cause another page to be displayed, showing people that have badges owned by a user. Clicking on button 825 may cause another page to be displayed, showing various options for adding a badge, for example by importing a badge or creating a badge.

Additional Embodiments

Figure 9:
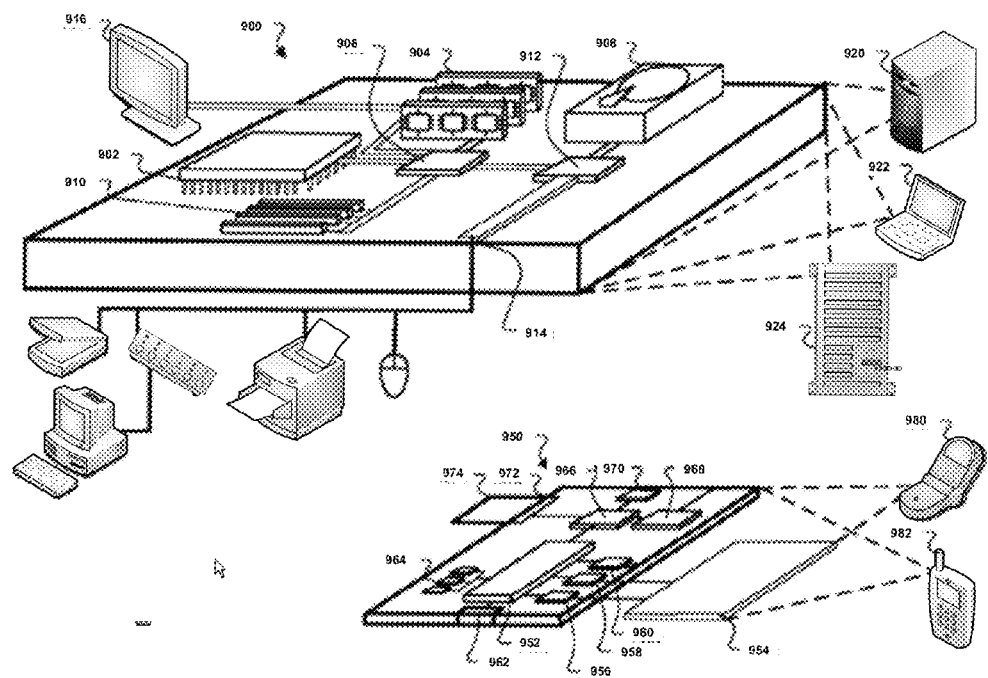
FIG. 9 is a block diagram of computing devices that may be used to implement the systems and methods described in this document, as either a client or as a server or plurality of servers.

FIG. 9 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile user devices, such as personal digital assistants, cellular telephones, smartphones, and other similar computing devices. Additionally computing device 900 or 950 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile user device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile user device.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

It should be noted that the transportation tag recommendations system is exemplary of the present disclosure, but the present disclosure is not so limited. The exemplary embodiments illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While embodiments and applications of this disclosure have been shown and described, it would be apparent to those skilled in the art having the benefit of this disclosure that many more modifications than mentioned above are possible without departing from the inventive concepts herein. The invention, therefore, is not to be restricted except in the spirit of the appended claims. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method, executing on one or more computing devices, for personal badges in a social network, said method comprising:
   receiving, at the one or more computing devices, in association with a user's account in a social network a badge to be credited to one or more other users of the social network, the badge comprising a graphical digital image;
   determining, at the one or more computing devices, a degree of similarity between a content of the badge comprising the graphical digital image and content of one or more other badges owned by one or more users connected to the user in the social network; and when the degree of similarity between the content of the badge and the content of the one or more other badges owned by the one or more users connected to the user in the social network is less than a predetermined amount, crediting the badge to particular ones of the one or more users connected to the user in the social network, as designated by the user; and storing in a memory coupled to the one or more computing devices, an indication that the particular ones of the one or more users connected to the user in the social network have been credited with the badge.

2. The method of claim 1, further comprising modifying a profile of the particular ones of the one or more users to indicate the crediting when the determined degree of similarity is less than the predetermined amount.

3. The method of claim 1, wherein the one or more users connected to the user comprise one or more friends of the user in the social network.

4. The method of claim 1, wherein the determining the degree of similarity between the content of the badge and the content of the one or more other badges comprises determining a degree of similarity between a textual description of the badge and textual descriptions of the one or more other badges.

5. The method of claim 1, further comprising:
if the degree of similarity is greater than the predetermined amount, applying to an owner of a particular one of the one or more other badges having the degree of similarity greater than the predetermined amount, to be a new owner of the particular one of the one or more other badges.

6. The method of claim 1, further comprising:
if the degree of similarity is greater than the predetermined amount, applying to an owner of a particular one of the one or more other badges having the degree of similarity greater than the predetermined amount, to be a co-owner of the particular one of the one or more other badges.

7. The method of claim 1, wherein the crediting the badge to the particular ones of the one or more users connected to the user, as designated by the user, further comprises crediting the badge to the particular ones of the one or more users connected by the user in response to a request from the particular ones of the one or more users connected to the user.

8. The method of claim 1, wherein the crediting the badge to particular ones of the one or more users connected to the user, as designated by the user, further comprises crediting the badge to the particular ones of the one or more users connected to the user if the particular ones of the one or more users connected to the user meet one or more criteria of the user.

9. The method of claim 8, further comprising verifying that the one or more users connected to the users meet the one or more criteria.

10. A computer system for personal badges, comprising:
one or more processors; and
memory to store:
one or more indications of users that have been credited with one or more badges;
one or more programs, the one or more programs, when executed on the one or more processors, performing the method comprising:
receiving a badge comprising a graphical digital image from a user to be credited to one or more other users of a social network;

determining a degree of similarity between a content of the badge comprising the graphical digital image and content of one or more other badges owned by one or more users connected to the user; and when the degree of similarity between the content of the badge and the content of the one or more other badges owned by the one or more users connected to the user in the social network is less than a predetermined amount, crediting the badge to particular ones of the one or more users as designated by the user; and storing in the memory an indication that the particular ones of the one or more users connected to the user have been credited with the badge.

11. The computer system of claim 10, wherein the method further comprises modifying a profile of the particular ones of the one or more users to indicate the crediting when the determined degree of similarity is less than the predetermined amount.

12. The computer system of claim 10, wherein the one or more users connected to the user comprise one or more friends of the user in the social network.

13. The computer system of claim 10, wherein the determining the degree of similarity between the content of the badge and the content of the one or more other badges comprises determining a degree of similarity between a textual description of the badge and textual descriptions of the one or more other badges.

14. The computer system of claim 10, wherein the method further comprises:
when the degree of similarity is greater than the predetermined amount, applying to an owner of a particular one of the one or more other badges having the degree of similarity greater than the predetermined amount, to be a new owner of the particular one of the one or more other badges.

15. The computer system of claim 10, wherein the method further comprises:
when the degree of similarity is greater than the predetermined amount, applying to an owner of a particular one of the one or more other badges having the degree of similarity greater than the predetermined amount, to be a co-owner of the particular one of the one or more other badges.

16. The computer system of claim 10, wherein the crediting the badge to particular ones of the one or more users as designated by the user comprises crediting the badge to the particular ones of the one or more users in response to a request from the particular ones of the one or more users.

17. The computer system of claim 10, wherein the crediting the badge to particular ones of the one or more users as designated by the user comprises crediting the badge to the particular ones of the one or more users if the particular ones of the one or more users meet one or more criteria of the user.

18. The computer system of claim 17, wherein the method further comprises verifying that the one or more users connected to the user meet the one or more criteria.

19. A nontransitory computer readable storage medium storing one or more programs configured to be executed by one or more processing units, said programs, when executing on the one or more processing units, performing the method of:
receiving in association with a user's account a badge to be credited to one or more other users, the badge comprising a graphical digital image;
determining a degree of similarity between a content of the badge comprising the graphical digital image and content of one or more other badges owned by one or more users connected to the user; and when the degree of similarity between the content of the badge and the content of the one or more other badges owned by the one or more users connected to the user is less than a predetermined amount, crediting the badge to particular ones of the one or more users connected to the user as designated by the user; and storing in a memory of the computer an indication that the particular ones of the one or more users connected to the user have been credited with the badge.

\* \* \* \* \*